United States Patent Office 2,859,123
Patented Nov. 4, 1958

2,859,123

WAX AND SHELLAC POLISHING COMPOSITION

Thomas B. Smith, Chicago, Ill., assignor to Simoniz Company, a corporaton of Delaware No Drawing. Application April 17, 1953
Serial No. 349,539

3 Claims. (Cl. 106—6)

This invention relates to a polishing composition having the property of drying to a clear, high luster without requiring rubbing or buffing.

The polishing composition of this invention includes a liquid carrier in which a wax is dispersed. The composition, when applied to a surface to be polished, dries to a high polish without requiring rubbing or buffing of the dried surface. One of the features of this invention is to provide such a composition containing a relatively large amount of shellac dispersed and dissolved in the carrier, the shellac being present preferably in an amount of about 7.5 to 10.5% by weight of the composition and having an acid number of at least about 65. Another feature of the invention is the provision of such a polishing composition containing borax in an amount sufficient only to insure substantially complete solubilizing of the shellac in the liquid carrier. Yet another feature of the invention is to provide such a composition including a spreading and gloss-promoting resin dispersed in the carrier and in which the composition has a solids content of between about 10 and 17% by weight. A specific feature of the invention is to provide a polishing composition comprising water, about 1.6 to 2.6% by weight of an oxidized microcrystalline wax dispersed therein, about 7.5 to 10.5% of shellac by weight of the composition dissolved and dispersed in the water with the shellac having an acid number of about 65 to 85, about 0.6 to 1.6% by weight of a spreading and gloss-promoting resin dispersed in the water and borax in an amount sufficient to insure substantially complete solubilizing of sheallac in the water, this amount being not greater than about 1.7% by weight of the composition and being about 12 to 16% by weight of the shellac, the composition having a solids content of about 10 to 17% by weight with these solids containing shellac and wax-resin in the proportions of about 80 to 60% by weight of shellac to 20 to 40% of the wax-resin mixture.

The improved polishing composition of this invention is quite stable and has a high freeze resistance in that the dispersed and dissolved solids, and particularly the wax and resin, will not precipitate even after repeated freezing and thawing. The reason for this is not completely understood, but the new composition has been observed as having this characteristic to a very high degree. The new polishing composition, after being applied and dried, has excellent ability to withstand wear and is resistant to marking. The dried surface is also resistant to water.

A very important feature of the composition is the inclusion of a relatively large amount of shellac of high quality. This shellac serves to produce a polishing composition having the improved characteristics described above. This shellac, which has an acid number of at least about 65, and preferably between about 65 and 85, is present in the relatively large amount of about 7.5 to 10.5% by weight of the composition.

In order to solubilize the shellac in the liquid carrier, only enough borax is preferably used to bring about a combined dispersing and dissolving of the shellac in the carrier which is preferably water. The term "solubilize" is used herein to indicate that the shellac is either dissolved completely or dissolved partially while the remainder is dispersed in a relatively fine dispersion so that it acts almost like a true solution.

In order that the dried composition will be resistant to water marking the borax is kept at a minimum. Thus, the amount of borax is preferably not greater than about 1.7% by weight of the composition.

The preferred wax in the composition is an oxidized microcrystalline wax with a penetration of less than 6 (ASTM D937–49). Typical waxes are "Crown #15" Wax, "Cardis #314" Wax, and "Petronauba C" Wax. The wax is preferably used in an amount of about 1.6 to 2.6% by weight of the composition.

The composition also preferably contains a dispersing and gloss-promoting resin preferably in an amount of about 0.6 to 1.6% by weight of the composition. This resin is preferably a terpene resin such as "Shanco Resin #300" which is a terpene phenol resin, and "Durez #219 Resin" which is an isomerized terpene phenolic resin.

The borax is employed in two parts. One part is used to aid the emulsification of the wax and resin while the second part is used to solubilize the shellac. This second part is used in an amount from about 11 to 15%, and preferably about 11 to 13%, by weight of the shellac. The total of the two parts of borax is between about 12 to 16%, and preferably between about 12 to 14%, by weight of the shellac.

The composition also contains the usual dispersing agent such as a soap produced by reaction of a long chain aliphatic fatty acid, or mixture of such acids and an alkali.

In preparing the polishing composition of this invention, the ingredients are preferably arranged in two separate batches and these two batches are then mixed to produce the final composition. One batch preferably contains the wax resin dispersed in the liquid carrier which is preferably water to produce a wax-resin blend. This first batch preferably contains about 1.6 to 2.6% oxidized microcrystalline wax, about 0.6 to 1.6% resin, about 0.5% fatty acid and 0.1% alkali to produce the soap and about 0.3 to 0.7% borax. This first batch contains sufficient water to give a total solids content of about 10 to 17% by weight.

The second batch contains about 7.5 to 10% shellac and the remainder of the borax. This second batch also contains sufficient water to give a solids content of about 10 to 17% by weight.

The final composition is preferably produced by mixing between 20 and 40% by weight of the first batch containing the wax and resin with from 80 to 60% of the second batch containing shellac.

An important feature of this invention appears to be that the polishing composition not only has a solids content of between about 10 and 17% by weight of composition, but that these solids contain shellac and wax-resin blend in the proportions of about 80 to 60% by weight of the first batch containing the shellac to 20 to 40% by weight of the second batch containing the above specified wax-resin blend.

In one method of making the polishing composition of this invention about 66 parts by weight of oxidized microcrystalline wax were mixed with about 206 parts by weight of resin and the mixture melted at an elevated temperature. In a separate container, about 170 parts by weight of water, 9½ parts of caustic soda and 8 parts of borax were mixed together and heated to dissolve the borax and caustic soda. The wax and resin were then emulsified in hot water by mixing the melted wax and resin, heated water, caustic soda, borax and 44 parts by weight of fatty acid. This mixture is then further emulsified by adding 2000 parts hot water and mixing. This produced the first batch.

To produce the second batch containing the shellac about 1500 parts by weight of water were heated to about 80° F. Then about 775 parts by weight of shellac were added to the water slowly with thorough agitation while maintaining this temperature. About 83.5 parts by weight of borax were added slowly with continued and thorough agitation. The agitation and heating at this temperature were continued until the batch begins to thin out. Then it is heated to a maximum temperature of 130° F. at which time about 8.5 parts by weight of borax were added slowly with continued agitation. As soon as the solution was relatively clear, about 3500 parts by weight of additional water were added. The solution was filtered and then the first batch containing the wax and resin was mixed with the second batch containing the shellac and the mixture thoroughly agitated to make the finished polishing composition.

The borate used herein is preferably the sodium tetraborate pentahydrate and the amounts specifically given herein are based on this compound. The decahydrate or any other hydrate may be used, if desired. Where this is done, the specific amounts given must be adjusted accordingly on a molecular weight basis.

Having described my invention as related to certain embodiments thereof, it is my intention that the invention be not limited by any details of description, unless otherwise specified, but rather be construed broadly within its spirit and scope as set out in the accompanying claims.

I claim:

1. A polishing composition capable of drying to a high, clear luster, comprising: water; shellac in an amount of about 7.5–10% by weight of the composition having an acid number of at least about 65; borax in an amount substantially only sufficient to solubilize the shellac in the water, this amount being not substantially greater than about 1.7% by weight of the composition and about 12–16% by weight of the shellac; and a water insoluble wax as an essential ingredient dispersed in said water, the composition having a total solids content of about 10–17% by weight of the composition.

2. A polishing composition capable of drying to a high, clear luster, comprising: water; shellac in an amount of about 7.5–10% by weight of the composition having an acid number of about 65–85; borax in an amount substantially only sufficient to solubilize the shellac in the water, this amount being not substantially greater than about 1.7% by weight of the composition and about 12–16% by weight of the shellac; and a water insoluble wax as an essential ingredient dispersed in said water, the composition having a total solids content of about 10–17% by weight of the composition.

3. A polishing composition capable of drying to a high, clear luster, comprising: water; shellac in an amount of about 7.5–10% by weight of the composition having an acid number of about 65–85; borax in an amount substantially only sufficient to solubilize the shellac in the water, this amount being not substantially greater than about 1.7% by weight of the composition and about 12–16% by weight of the shellac; and a water insoluble, oxidized microcrystalline wax as an essential ingredient dispersed in said water, the composition having a total solids content of about 10–17% by weight of the composition.

References Cited in the file of this patent

UNITED STATES PATENTS

| | | |
|---|---|---|
| 2,234,934 | Steinle et al. | Mar. 11, 1941 |
| 2,274,509 | Thomson | Feb. 24, 1942 |
| 2,275,659 | Steinle et al. | Mar. 10, 1942 |
| 2,371,473 | Sanford | Mar. 13, 1945 |
| 2,424,952 | Handy | July 29, 1947 |
| 2,500,427 | Moose | Mar. 14, 1950 |
| 2,541,006 | Porter et al. | Feb. 6, 1951 |
| 2,733,224 | Smith et al. | Jan. 31, 1956 |
| 2,776,268 | Morrill et al. | Jan. 1, 1957 |

OTHER REFERENCES

Noller: Textbook of Organic Chemistry, pages 564–567, pub. by W. B. Saunders Co. (1951).